United States Patent [19]

Pretzer

[11] 4,455,950

[45] Jun. 26, 1984

[54] TRANSPLANTING APPARATUS UTILIZING A DISC MECHANISM FOR TRANSFERRING PLANTS FROM A SUPPLY TAPE TO THE FURROW

[75] Inventor: Paul R. Pretzer, Brooklyn Heights Village, Ohio

[73] Assignee: General Mills, Inc., Minneapolis, Minn.

[21] Appl. No.: 972,809

[22] Filed: Dec. 26, 1978

Related U.S. Application Data

[63] Continuation of Ser. No. 826,808, Aug. 22, 1977, abandoned.

[51] Int. Cl.³ ............... A01C 11/02; A01G 23/04
[52] U.S. Cl. ................................. 111/2; 111/3
[58] Field of Search ........................... 111/2, 3

[56] References Cited

U.S. PATENT DOCUMENTS

| 2,565,548 | 8/1951 | Cordes | 111/3 |
| 2,609,767 | 9/1952 | Tapp et al. | 111/3 |
| 2,632,411 | 3/1953 | Cordes | 111/3 |

FOREIGN PATENT DOCUMENTS

| 822947 | 9/1969 | Canada | 111/2 |
| 1161720 | 1/1964 | Fed. Rep. of Germany | 111/3 |
| 984701 | 7/1951 | France | 111/3 |
| 1266234 | 5/1961 | France | 111/3 |
| 20322 | 8/1929 | Netherlands | 111/3 |
| 263799 | 7/1927 | United Kingdom | 111/3 |
| 169919 | 7/1965 | U.S.S.R. | 111/3 |

*Primary Examiner*—Steven A. Bratlie
*Attorney, Agent, or Firm*—Gene O. Enockson; L. MeRoy Lillehaugen

[57] ABSTRACT

The transplanting apparatus includes a mobile frame supporting a rigid disc and a flexible disc mounted on a transverse shaft for rotation in unison about a horizontal axis as the frame traverses a strip of soil to transfer plants from a supply tape to a furrow. Although the discs are spaced apart somewhat at their centers or hubs, at an upper location the flexible disc is flexed even a greater distance away from the rigid disc to provide a continuously open space for the successive reception of the leaf ends of plants delivered from a supply tape. At a lower location the flexible disc is separated from the rigid disc only enough to open the discs for the successive release of the plants into the furrow. As the plants are transferred from the upper location to the lower location, the periphery of the flexible disc is pressed toward the rigid disc to assure retention of the plants during their downward travel. The apparatus further includes a furrow opener and a furrow closer.

4 Claims, 8 Drawing Figures

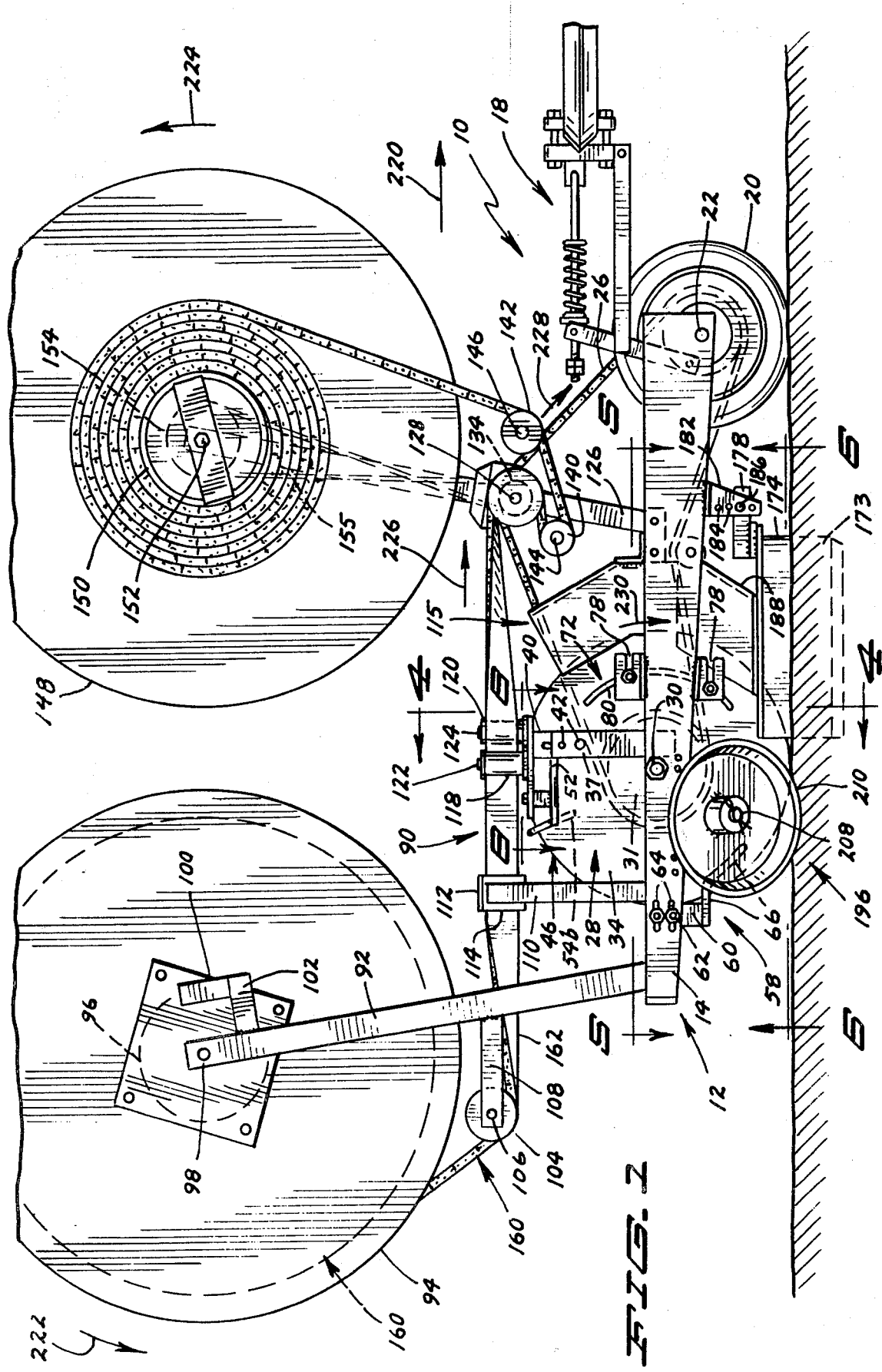

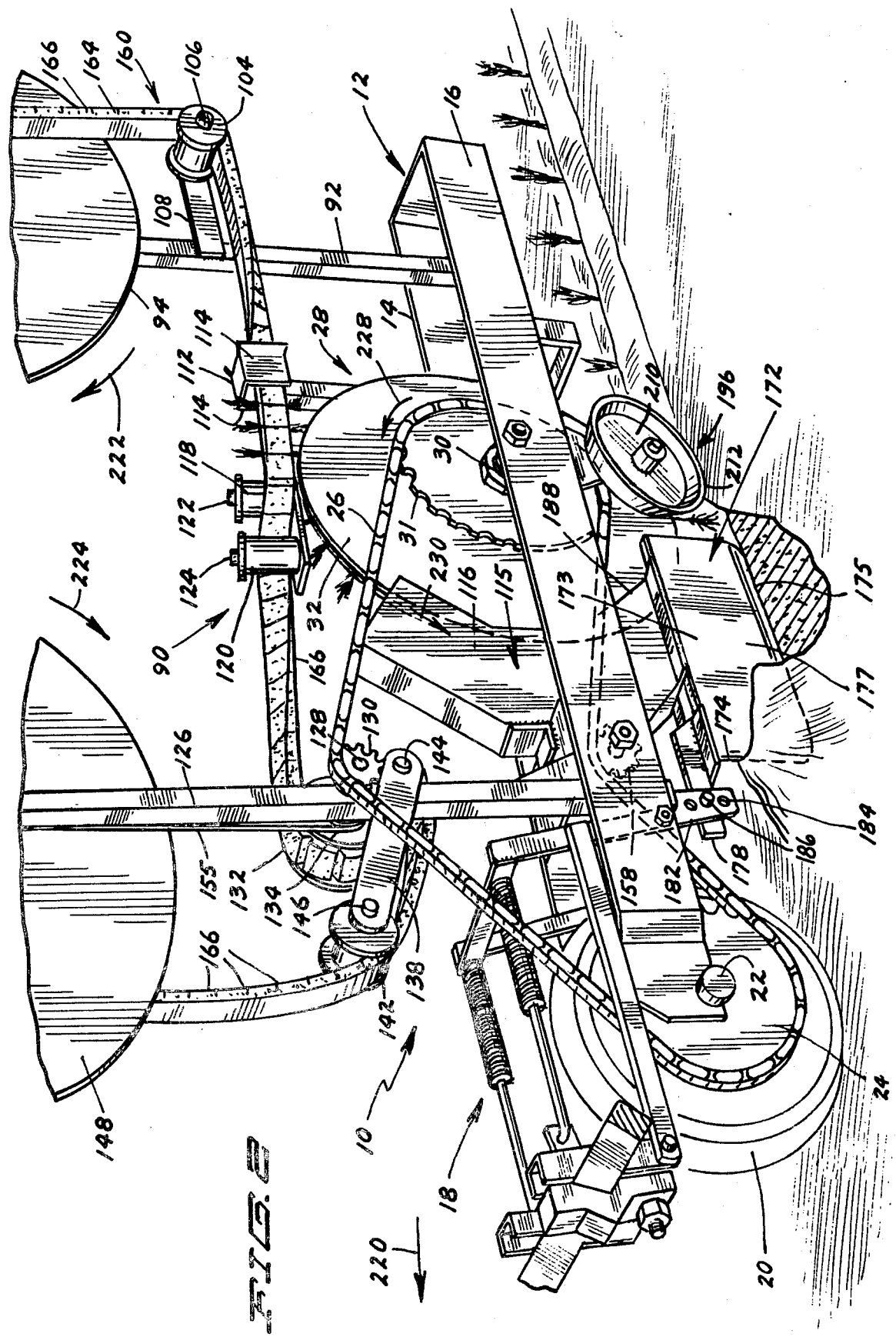

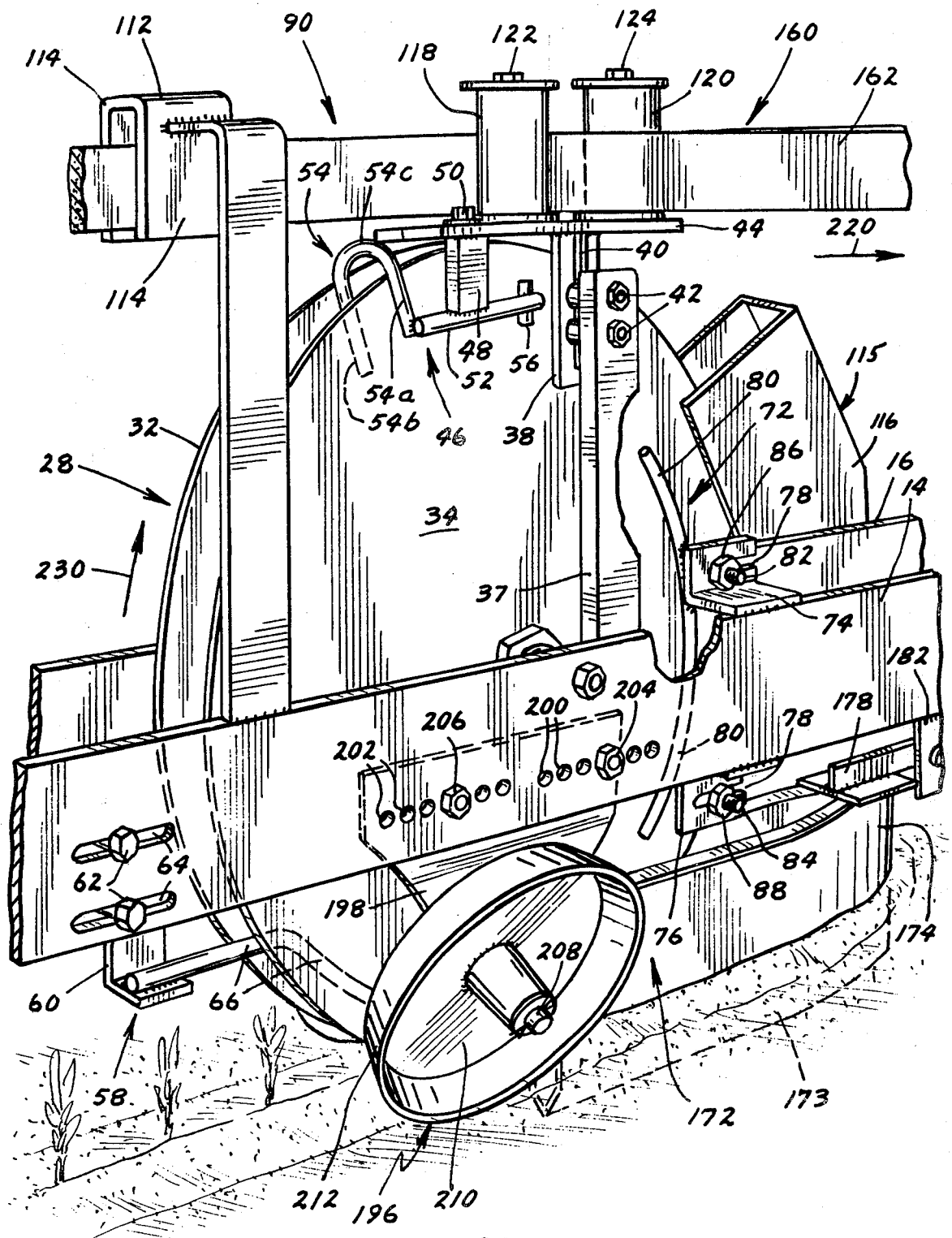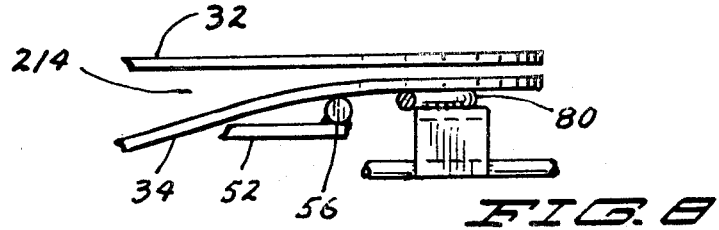

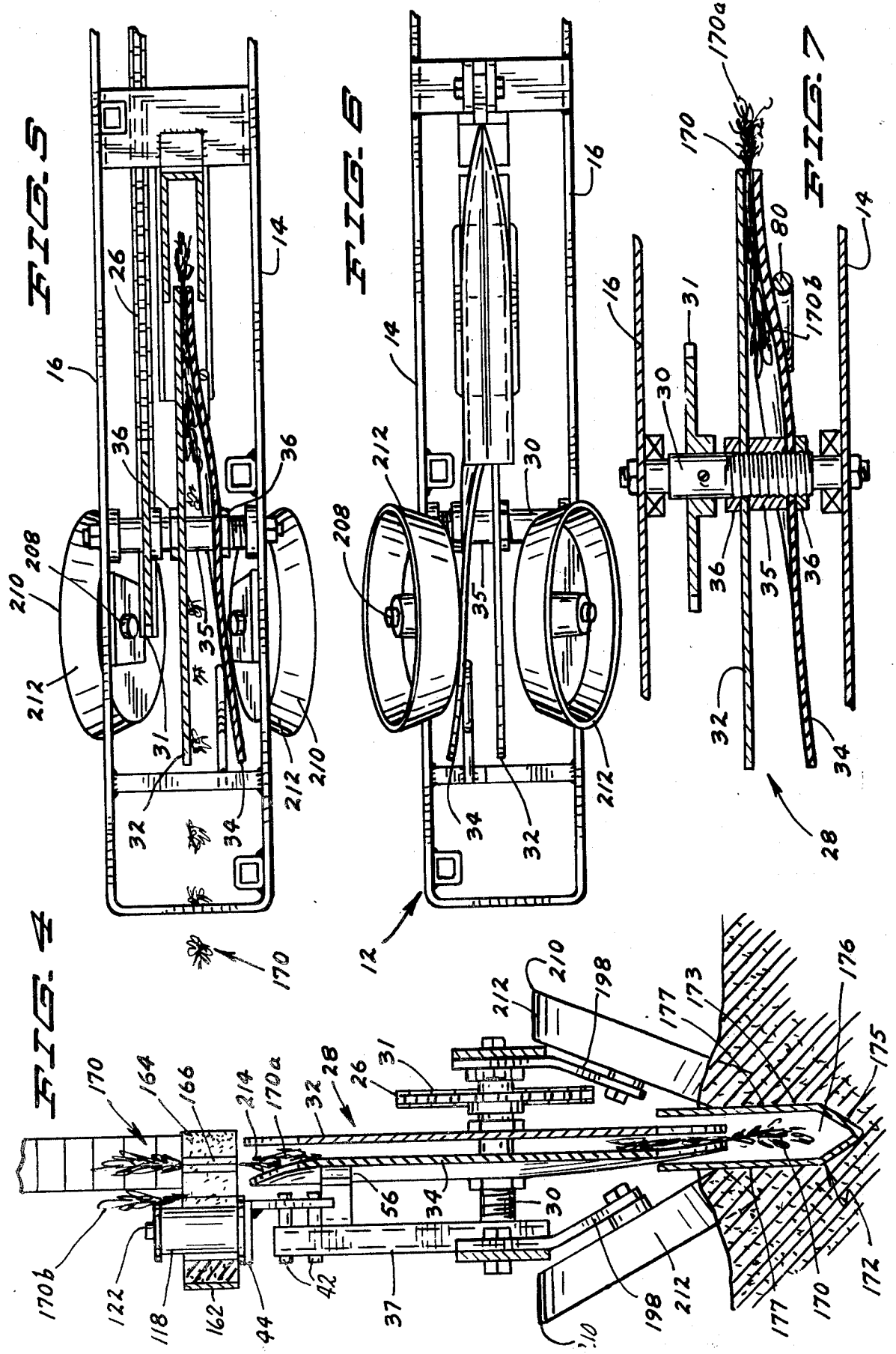

TRANSPLANTING APPARATUS UTILIZING A DISC MECHANISM FOR TRANSFERRING PLANTS FROM A SUPPLY TAPE TO THE FURROW

CROSS-REFERENCE TO RELATED APPLICATION

This is a continuation of application Ser. No. 826,808, filed Aug. 22, 1977 now abandoned.

BACKGROUND OF THE INVENTION

1. Field of the Invention

This invention relates generally to transplanting apparatus for planting tree seedlings, lettuce, as well as other partially matured plants, and pertains more particularly to apparatus for transferring the items to be planted from a tape supply into a furrow formed as the apparatus advances along the ground.

2. Description of the Prior Art

Various machines have been contrived for planting or transplanting small plants of various types. The prior art machines with which I am acquainted have met with varying degrees of success. One particular transplanting machine that has proved reasonably successful is described in U.S. Pat. No. 3,719,158 granted on Mar. 6, 1973 to Herbert C. O. Roths titled "Transplanting Machine". However, the machine is more complicated than need be, requiring a number of synchronized movements that render it quite intricate and costly.

SUMMARY OF THE INVENTION

Accordingly, the present invention has for a general object the provision of automated transplanting apparatus that performs all of the functions associated with transplanting, yet which is simple, reliable and relatively inexpensive.

Another object is to provide transplanting apparatus in which the spacing of the plants in the furrow can be varied to suit different conditions. More specifically, it is within the purview of the instant invention to load plants onto a supply tape at spaced intervals determined by the design of the tape, and through the agency of a pair of transfer discs, deposit them in the furrow at spaced locations best suited for the growth of that particular variety of plant, the distance between plants being readily modified by simply changing the tape supply speed with respect to the disc speed.

Still another object of the invention is to provide transplanting apparatus that can handle not only different types of plants but different lengths as well.

Yet another object that is quite important is to gently hold the plants during their transfer from the supply tape to the furrow. More specifically, an aim of the invention is to grip the plant stems between their roots and their leaves which is a region where the plants are less vulnerable to damage. Accordingly, it is planned that the periphery of the flexible disc be pressed against the periphery of the rigid disc with the stems therebetween in order to effect the transfer of the plants with as little damage to them as possible.

The invention has for still an additional object the incorporation into the apparatus a timing action in which the transfer mechanism exerts a slight pull on each plant as it receives the plant from the supply tape to promote a smooth plant transfer at the top of the discs, and in which the furrow closer exerts a slight pull on each plant at the bottom of the discs to effect a smooth transfer at this lower location as well and to assure that the plant is vertical or upright in the furrow.

Also, the invention has for a further object the provision of transplanting apparatus which can be built sufficiently narrow such that it can be used in transplanting in closely spaced multiple rows, more specifically, rows only one foot apart.

Briefly, my invention comprises a mobile frame on which a pair of plant transfer discs are mounted for rotation in unison on a horizontal axis, the discs being in a side-by-side relation, although slightly spaced at their centers. One disc is rigid and the other flexible. Near the top, more specifically at the eleven o'clock position, a member extends inwardly between the two discs so as to flex the flexible disc away from the rigid disc at this upper location, thereby forming a continuously open V-shaped space or void into which the leaf end of the plants to be transplanted are successively delivered from a tape supply. At the top or twelve o'clock position a second member bears against the outer surface of the flexible disc and presses this disc toward the rigid disc to close the V-shaped opening formed by the first member. At the bottom or six o'clock position the flexible disc is flexed away from the rigid disc by a third member, which extends inwardly between the two discs, to successively release the plants that have been transferred from the upper location to the lower location, the plants being delivered root first into a furrow formed as the apparatus traverses a strip of ground to be planted. As the discs rotate, a fourth member acts against the outside of the downwardly traveling segment of the flexible disc to press it against the rigid disc to assure retention of the plants as they are being transferred from the upper location to the lower location.

A supply tape composed of various soft elastomeric blocks secured to a flexible, but nonstretching, backing strip provides slits into which the various plants can be initially inserted. The supply tape is fed past the upper location and flexed so as to open the slits as each slit passes above the discs. However, as each plant arrives, it first advances through the open space continuously provided between the discs as they approach the top or twelve o'clock position, and as the open space becomes progressively narrower, the periphery of the flexible disc is pressed against the rigid disc at the twelve o'clock position with the stem of the plant clasped therebetween, the timing being such that the discs literally pull the plant from the supply tape at the moment the slit opens to release the plant.

The speed of the supply tape may be changed in order to change the rate at which the plants are delivered to the transfer discs and thereby deposit the plants at appropriately selected spacings in the furrow. A furrow opener precedes the transfer discs and a pair of packing wheels trail behind the discs so that the apparatus achieves a completely automated transplanting of various plants.

BRIEF DESCRIPTION OF THE DRAWINGS

FIG. 1 is an elevational view of one side of transplanting apparatus exemplifying my invention;

FIG. 2 is a perspective view taken from the opposite side appearing in FIG. 1;

FIG. 3 is an enlarged perspective view of a portion of the apparatus seen in FIG. 1;

FIG. 4 is a vertical sectional view taken in the direction of line 4—4 in FIG. 1;

FIG. 5 is a horizontal sectional view taken in the direction of line 5—5 in FIG. 1;

FIG. 6 is a bottom plan view taken in the direction of line 5—5 in FIG. 1;

FIG. 7 is an enlarged detail view constituting a portion of FIG. 5, and

FIG. 8 is another detail view, this view looking downwardly at the two discs in the direction of line 8—8 in FIG. 1 for the purpose of depicting the V-shaped opening into which the plants are successively delivered.

DESCRIPTION OF THE PREFERRED EMBODIMENT

Transplanting apparatus illustrating my invention has been denoted generally by the reference numeral 10. The apparatus 10 comprises a frame 12 composed of laterally spaced side members 14, 16. As the description progresses, it will become evident that the apparatus 10 can be sufficiently narrow that parallel or multiple rows only one foot apart can be transplanted. In other words, the side members 14, 16 can be quite close together without detracting from the efficient operation and proper functioning of the various components hereinafter described. Although the apparatus 10 can be self-propelled (and this is desirable when transplanting rows having a narrow spacing), it is simpler to assume that it is towed or pulld by a tractor (not shown); therefore, a drawbar 18 extends forwardly from the right or front end of the frame 12.

Supporting the forward end of the frame 12 is a ground-engaging drive wheel 20 journaled for rotation on a shaft 22 extending between the spaced side members 14, 16. The shaft 22 has a drive sprocket 24 keyed thereto.

A chain 26 is in mesh with the drive sprocket 24, the chain 26 extending rearwardly so as to rotate a plant transfer mechanism 28. More specifically, the transfer mechanism 28 includes a horizontal shaft 30 having its ends journaled for rotation in the spaced side members 14, 16 of the frame 12, the shaft 30 having a drive sprocket 31 secured thereto.

Playing an important role in the practicing of my invention and constituting an integral part of the transfer mechanism 28 is a rigid disc 32, preferably of steel, mounted on the shaft 30 and a flexible disc 34, preferably of reinforced rubber, also mounted on the same shaft 30. The disc 34 is slightly larger in diameter than the disc 32. A tubular spacer or sleeve 35 (FIG. 7) about 1¼ inches long encircles the shaft 30 between the discs 32, 34 to keep them separated or spaced apart at their centers or hubs. A portion of the shaft 30 is threaded and the two discs 32, 34 are clamped in their slightly spaced relation by two nuts 36. In practice, two pins (not shown) extend through the discs 32, 34 to prevent any relative rotation therebetween. In this way, the discs 32, 34 are rotated in unison by means of the chain 26 and the sprockets 24, 31.

As can be most readily appreciated from FIG. 3, the transfer mechanism 28 further comprises an upstanding standard 37, preferably of rectangular tubing, welded at its lower end to the side member 14 of the frame 12. The standard 37 carries at its upper end a vertically adjustable bracket 38 having a slot 40 therein. Bolts 42 extend through holes in the standard 37 and the slot 40 so as to maintain the bracket 38 at an appropriate elevation. The bracket 38 supports a horizontal plate 44.

At this time, attention is directed to an opening or flexing unit indicated generally by the reference numeral 46. The unit 46 includes a spacer block 48 secured to the underside of the horizontal plate 44 by means of an anchor bolt 50. A straight rod 52 is welded to the underside of the spacer block 48 and projects in opposite directions therefrom. An inverted U-shaped rod 54 composed of leg portions 54a, 54b and a connecting bight portion 54c has its leg portion 54a welded to one projecting end of the rod 52 so that the bight 54c curves over the peripheral edge of the flexible disc 34 in order that the leg 54b extends downwardly between the confronting annular portions of the two discs 32, 34. The member or leg 54b bears against the inner surface of the flexible disc 34 at the eleven o'clock position so as to flex the flexible disc 34 away from the rigid disc 32 to provide an open space (later referred to by the reference numeral 214) for a purpose presently to be made manifest. The other end of the straight rod 52 carries an integral presser shoe 56. Thus, while the leg 54b spreads or separates the flexible disc 34 away from the rigid disc 32, the pressure shoe 56 bears against the outer surface of the flexible disc 34 at the twelve o'clock position so as to urge the disc 34 against the rigid disc 32. Here again, the reason for this will soon be explained.

Whereas the opener or flexing unit 46 is located at substantially the eleven o'clock position, as already explained, a lower opening or flexing unit 58 is located so as to separate or open the discs 32, 34 at substantially the six o'clock position. The unit 58 includes an angle iron 60 adjustably secured to the side member 14 by a pair of bolts 62 extending inwardly through two horizontal slots 64 into tapped holes provided in the vertical flange of the member 60. Welded to the horizontal flange of the member 60 is a curved rod 66 that flexes the bottom marginal portion of the flexible disc 34 away from the rigid disc 32. Although not completely apparent at this particular stage of the description, the lower unit 58 effects a release of the plants that are transferred from the twelve o'clock or upper location to the six o'clock or lower location.

Referring now to what will be termed a closing unit 72, it will be discerned that it includes an upper angle iron 74 and a lower angle iron 76, the horizontal flanges of these angle irons 74, 76 being welded to the side member 14 of the frame 12. Each vertical flange of the angle members 74, 76 has a horizontal slot 78 formed therein. It will be noted that an arcuate presser rod 80 subtends a substantial arc extending generally from the one or two o'clock position to about the five o'clock position. The presser rod 80 has an upper threaded stud 82 and a lower threaded stud 84 which are received in the slots 78 of the angle irons 74 and 76, there being a nut 86 on the stud 82 and a nut 88 on the stud 84 so as to clamp the arcuate presser rod 80 in a preferred radially located position. The presser rod 80 functions to urge the flexible disc 34 toward the rigid disc 32 during the major portion of the downward travel of the discs 32, 34. Of course, the presser shoe 56 initiates the closing action; the arcuate rod 80 continues it for the remainder of the downward travel.

Referring now to the plant supply mechanism indicated generally by the reference numeral 90, it will be seen that it includes a rear mast or support 92 that extends vertically upwardly the side 16 of the frame 12. Carried at the upper end of the mast 92 is a tape supply reel 94 having a hub 96 thereon. The reel 94 is rotatably mounted on a pin 98 extending from the upper end of the mast 92. A drag is imposed on the reel 94 through the agency of a friction brake 100 (FIG. 1) mounted on an arm 102 which is attached to the mast 92. The plant supply mechanism 90 further includes a guide or a deflection roller 104 mounted on a pin 106 carried at the free end of an arm 108 extending from a lower portion of the mast 92.

A post 110 has its lower end welded to the frame side member 14. The support 110 has attached to its upper end a U-shaped member 112 providing a pair of laterally spaced guide plates 114 for twisting the plant supply tape still to be referred to. Larger plates for guiding the leaves, while still held by the supply tape have been omitted for reasons of clarity in that they merely guide or direct the leaf ends of the plants to be transplanted into the transfer mechanism 28, more specifically between the discs 32 and 34. However, even though its omission would perhaps make the drawings simpler, a channel-shaped member 115 has been illustrated providing a pair of laterally spaced plates 116 that guide the root ends of the plants while held between the discs 32, 34 as the plants are being transferred downwardly. The plates 116 are secured directly to the side members 14, 16.

Continuing with the description of the plant supply mechanism 90, it will now be explained that it further includes a pair of tape flexing or diverting rollers 118, 120 mounted on vertical pins 122, 124, respectively, that extend upwardly from the previously mentioned horizontal plate 44.

A forwardly disposed mast or support 126 has its lower end secured to the side member 16. Partway up the mast 126 is journaled a transverse shaft 128 having a hexagonal portion for removably keying a sprocket 130 on the shaft 128 and about which the previously mentioned chain 26 passes. Also carried on the shaft 128 is a tape drive roller 132 and a pulley 134. Secured to the mast 126 beneath the shaft 128 is an inclined arm 138 carrying at its opposite ends a pair of deflecting or guide rollers 140, 142 mounted on transverse pins 144, 146, respectively, attached to the arm 138.

Still continuing with the description of the plant supply mechanism 190, attention is now called to a rewind reel 148 having a hub 150, the hub 150 being journaled on a shaft 152 extending from the upper end of the mast 126. Also on the shaft 152 is a pulley 154. A rewind drive belt 155 (with slipping tension to accommodate for take-up speed changes of the rewind reel 148, the reel 148 rotating fastest during the initial rewinding of the tape yet to be specifically referred to) extends about the pulleys 134, 154 so as to rotate the rewind reel 148 when the shaft 128 is rotated via the sprocket 130 and chain 26.

Having mentioned the sprockets 24, 31 and 130, the chain 26 being entrained about all three of these sprockets, it should now be pointed out that the relative size of the sprockets can be changed in order to provide different speed variations for a purpose soon to become clearer. More specifically, it is planned that the sprocket 130 be changed, the substitution having been facilitated in practice by having a hexagonally configured opening therein which fits over the hexagonal portion of the shaft 128. Because of the intended change in the size of the sprocket 130, plus the fact that any slack in the chain 26 should be taken up, there is employed a spring loaded idler sprocket 158 mounted on the frame 12. The sprocket 158 simply functions to keep the chain 26 taut so no need is seen for detailing the way in which it is mounted and the manner in which it is spring loaded.

A supply tape has been indicated generally by the reference numeral 160. More specifically, the tape supply includes a flexible nonstretching belt or backing strip 162 to which soft foamed elastomeric blocks 164 are adhesively secured providing a multiplicity of slits 166, there being one such slit 166 between each two blocks 164. Actually, a long strip of the resilient and readily compressible elastomeric material is initially bonded to the belt 162 and cut at desired intervals to form the slits 166. This supply tape 160 is generally similar to that referred to in U.S. Pat. No. 3,719,158, herein earlier mentioned. However, its construction is simpler in that the grommetted sprocket holes used for the synchronized advancement of the tape needed for the transplanting machine of U.S. Pat. No. 3,719,158 are not required when practicing the instant invention.

The function of the supply tape 160 is to furnish partially grown plants 170 in a serial sequence to the transfer mechanism 28. It will be helpful to assign the reference numeral 170a to the root end of the plants 170 and the reference numeral 170b to the leaf end thereof. The root ends 170a are inserted into the slits 166 by bending the belt or backing strip 162 sufficiently to open the slits. However, when the tape 160 is straight or substantially so, the adjacent blocks 164 gently squeeze or press against the root ends 170a so as to hold them.

My apparatus 10 further comprises a furrow opening unit 172. The unit 172 includes a plow structure 173 having a forwardly disposed vertical edge 174 that separates or penetrates the soil to form the furrow or trench as the apparatus 10 is advanced across the field to be planted. The plow structure 173 has a closed V-shaped bottom 175 forming a slot 176, and laterally spaced panels 177 that straddle the more forward segments of the discs 32, 34 to prevent the furrow from caving in until the plants 170 have been dropped therein.

The furrow opening unit 172 has an arm 178 extending forwardly from the plow structure 173 and by means of a hole in the arm the forward end of the plow structure 173 can be anchored to a bracket 182, the upper end of the bracket 182 being welded to the side member 14 of the frame 12. A vertical adjustment of the forward end of the plow structure 173 is realized via a series of vertically extending holes 184 in the bracket 182 and a pin 186 that is inserted through the most appropriate holes 184, thereby determining the depth at which the plow structure 173 travels in forming the furrow.

Toward the rear of the plow structure 173 is a pair of upwardly extending plates 188. The upper ends of the plates 188 can be adjustably (although not shown as so being) attached to the side members to vary the depth at which the rear of the plow 173 extends.

A furrow closing unit 196 is also employed. It includes a pair of angled brackets 198, there being one depending from the side member 14 and the other from the side member 16. As perhaps best viewed in FIG. 3, a series of horizontally disposed holes 200 and a series of similar holes 202 are formed in the two side members 14, 16. Bolts 204 and 206 are positioned in selected holes 200 and 202 so as to orient properly the brackets 198 in a fore and aft direction with respect to the discs 32 and 34. The brackets 198 are shaped so that axles 208 angle outwardly and downwardly to rotatably support canted soil packing wheels 210 having soil engaging rims 212 which press the spread-apart soil back into the furrow to complete the transplanting of the plants 170. As will become apparent from the operational description now to be given, it is important to position the packing wheels 210 with respect to the discs 32 and 34 so as to assist with the release of the root ends 170b of the plants 170 from the transfer mechanism 28.

Operation

In preparing my transplanting apparatus 10 for use, the plants 170 are placed in the various slits 166 between the resilient blocks 164 of the supply tape 160. The loaded tape 160 is then coiled on the supply reel 94 and the leading end of the tape is brought around the idler roller 104. Advancement of the tape 160 is manually continued, the tape being placed between the two tape flexing rollers 118, 120. From the rollers 118, 120 it is threaded around the drive roller 122, past the two guide rollers 140 and 142, and finally upwardly to the hub 150 of the rewind reel 148. The foregoing results in a stretch of several feet of tape beyond the tape flexing rollers 118, 120 where the various plants are released that need not have any plants contained in the slits 166 in this length of tape.

Depending upon the variety and size of the plants 170, the furrow opening unit 172 should be mounted to provide the proper depth of furrow, the position of the arm 178 and the plate 188 readily permitting this.

Various adjustments can be readily made as far as the plant transfer mechanism 28 is concerned. In this regard, the members 54 (together with the member 56), 70 and 80 of the units 46, 58 and 72 are individually adjustable to achieve a timed plant transfer and also so that plants of different lengths and varieties can be transplanted. More specifically, it is important that the shoe 56 close the V-shaped opening 214 (FIG. 8) at the top just as the plants 170 are being released from the supply tape 160.

Further, since the plants 170 should be held by the discs 32, 34 at their stems, that is between the root ends 170a and the leaf ends 170b, members 56 and 80 should be properly positioned so that this holding action is achieved. Accordingly, it follows that the member 54 should be inserted between the discs 32 and 34 to a greater or lesser distance depending on whether the plant 170 has relatively long leaves 170b and/or relatively long roots 170a. Also, the arcuate member 80 of the closing unit 72, which presses against the outer side of the flexible disc 34, should bear against the most appropriate arcuate portion of the flexible disc 34 so as to effect a gentle gripping of the plants adjacent the disc peripheries, thereby causing less damage to the plants during their downward travel while being transferred from the upper location where they are received to the lower location where they are released. As best understood from FIG. 7, the member 80 is radially positioned somewhat inwardly from the periphery of the flexible disc 34 so as to preserve the flared or diverging space accommodating the leaves 170b.

Once the several member units 46, 58 and 72 have been properly positioned, when the apparatus 10 is towed by a tractor (not shown, although the apparatus can be self-propelled as already indicated), then various movements automatically occur. It will be helpful, it is believed, to assign arrows to these movements. Therefore, the arrow labeled 220 denotes the direction of travel of the apparatus 10 across the strip of soil to be planted. The arrow 222 indicates the direction in which the supply reel 94 rotates, whereas the arrow 224 denotes the direction in which the rewind reel 148 rotates. The direction in which the supply tape 160 moves is indicated by the reference numeral 226. The direction in which the chain 26 moves has been indicated by the reference numeral 228, the chain 26 causing the discs 32 and 34 to rotate in the direction of the arrow 230.

Inasmuch as the member 54, more specifically its leg 54b, belonging to the unit 46 extends downwardly between the two discs 32 and 34, actually bearing against the inner surface of the annular portion of the flexible disc 34 adjacent its periphery, it flexes the annular portion outwardly away from the rigid disc 32. This results in the formation of the V-shaped open space labeled 214 in FIG. 8. From FIG. 2, it is believed evident that the tape-flexing rollers 118 and 120 deflect the tape 160 in a direction to open the various slits 166 as they pass above the space or opening 214, more precisely directly over the end of the opening 214 being closed by the presser shoe 56. It should be recognized that entrance to the space or opening 214 is constantly kept open by virtue of the deflective action exerted against the flexible disc 34 by the leg 54b. However, the shoe 56 bears against the outer side of the flexible disc 34 so as to press the disc 34 closed just as the slits 166 open, thereby gently pulling the leaf ends 170b from the tape 160.

To assure retention of the plants 170, the arcuate rod 80 of the closing unit continues the pressural action initiated by the shoe 56, doing so through an arc or angle extending downwardly to the lower location where the plants are released. Inasmuch as FIG. 5 is taken in the direction of line 5—5 of FIG. 1, it can be seen that the periphery of the disc 34 is being pressed toward the disc 32 to hold the plants 170 at their stems between their root and leaf ends. The invention permits only enough pressure to be applied to hold the particular type of plant 170 being transplanted. Consequently, the peripheries of the discs 32, 34 need not actually touch, as is believed evident from FIGS. 5 and 7 (and also to a degree from FIG. 8, although a plant does not appear in this particular view); instead, they need only contact the plant stems with sufficient firmness to assure their retention during the downward transfer phase of the operation.

Once the plants 170 reach the lower location, the rod or finger 66 of the lower opening unit 58 flexes the flexible disc 34 away from the rigid disc just enough to eliminate the holding pressure that has been exerted by the rod 80 up to this point. This releases the plants 170, more specifically, their leaf ends 170b which are now free to be pulled from between the discs 32, 34. The plants 170 are pulled downwardly from the discs 32, 34 by the furrow closing unit 196 in that the rims 212 of the packing wheels 210 immediately press the soil displaced by the furrow opening unit 172 back into the furrow and against the root ends 170a. This timed action is achieved by properly positioning the packing wheels 210 in relation to the discs 32, 34, so that their canted rims 212 press the soil firmly around the root ends 170a. The adjustable brackets 198 are movable forwardly or rearwardly to shift the wheels 220 into the sought after optimum relation with the discs 32, 34, as should be readily understandable. Consequently, the plants 170 are transplanted in an upright manner.

Inasmuch as plants 170 should be spaced during the transplanting thereof at intervals or spacings most appropriate to the particular variety of plant, the apparatus 10 illustrating my invention lends itself readily to obtaining the best spacing between plants as they are placed in the furrow. In this regard, the sprocket 130, being removable from the shaft 128, can be changed, a larger or smaller sprocket altering the speed at which the tape 160 is advanced in relation to the forward speed of the apparatus 10 in the direction of the arrow 220 and hence determining the number of plants 170 delivered to the transfer mechanism 28 during a given interval of time. Consequently, it is not necessary to change to a different plant supply tape 160 with different slit spacings.

Consequently, my apparatus 10 is quite versatile and is susceptible to various alterations which make it suitable for the effective and efficient transplanting of different varieties of plants, with minimal amount of damage to fragile plants, such as bibb lettuce, and virtually no damage to rough plants, such as tree seedlings. Because of its extreme simplicity and ruggedness, the apparatus 10 functions well in the field, resulting in very little downtime for maintenance and repairs.

I claim:

1. Transplanting apparatus comprising a mobile frame adapted to traverse a strip of soil to be planted, means mounted on said frame for forming a furrow, first and second discs rotatably carried on said frame to the rear of said means for forming a furrow, said second disc having at least an annular flexible portion adjacent its periphery, means on said frame for rotating said discs in unison about a generally horizontal axis, means forming a V-shaped opening between said first and second discs at an upper angular location, said V-shaped opening when viewed from above having a closed end in the direction said discs rotate, a tape including a flexible backing strip and a series of resilient blocks on said strip forming slits for holding the plants to be transplanted, means for pulling a longitudinal section of said tape in the direction said discs rotate past said upper angular location with said blocks and slits generally vertical and parallel to each other for successively introducing a portion of said plants into the larger end of said V-shaped opening and advancing said plant portions in a straight line toward the closed end of said V-shaped opening, means for changing the direction of tape travel at an elevation directly above the closed end of said V-shaped opening to release said plants at the closed end of said V-shaped opening for immediate gripping thereof by the annular portions of said discs that are at that time forming the closed end of said V-shaped opening for transfer to a lower angular location, and means forming a second V-shaped opening between said first and second discs at said lower angular location for releasing said plants at said lower angular location into the furrow formed by said furrow-forming means, said transplanting apparatus including a ground-engaging wheel for supporting the forward end of said frame, a drive sprocket associated with said ground-engaging wheel, a driven sprocket associated with said discs, a chain entrained about said sprockets for causing said discs to rotate at a speed corresponding to the forward speed of said apparatus, a removable sprocket about which said chain is entrained, said tape means being driven by said removable sprocket, whereby different size sprockets can be substituted for said removable sprocket to change the speed at which the tape is pulled and hence to change the rate at which said slits open above the closed end of said V-shaped opening and hence the rate at which said plants enter said V-shaped opening with the result that plants can be deposited in said furrow at selected spacings determined by the size of said removable sprocket.

2. Transplanting apparatus in accordance with claim 1 in which said means forming said V-shaped opening at said upper angular location includes a first member extending inwardly and downwardly to bear against the inner surface of said annular flexible portion of said second disc at a position spaced from the closed end of said V-shaped opening in a direction opposite to the direction said discs rotate and including a second member bearing against the outer surface of said annular flexible portion of said second disc at a position adjacent the closed end of said V-shaped opening to press said annular portion toward said first disc to form the closed end of said first V-shaped opening.

3. Transplanting apparatus in accordance with claim 2 in which said means forming said second V-shaped opening includes a member extending inwardly to bear against the inner surface of said annular flexible portion of said second disc at a position spaced from the closed end of said second V-shaped opening in the direction said discs rotate to effect the release of said plants at said lower angular location into the furrow formed by said furrow-forming means.

4. Transplanting apparatus in accordance with claim 3 including an arcuate member bearing against the outer surface of said annular flexible portion of said second disc to maintain said annular flexible portion of said second disc in close proximity to said first disc so as to hold the plants to be transplanted until they reach said lower angular location.

* * * * *